July 27, 1926.

T. C. MAHON ET AL 1,593,805

AIR VALVE FOR PNEUMATIC TIRES

Filed April 10, 1924

INVENTORS
THOMAS C. MAHON
EDWARD M. LE FLUFY
BY
Fetherstonhaugh & Co
ATTORNEYS

Patented July 27, 1926.

1,593,805

UNITED STATES PATENT OFFICE.

THOMAS C. MAHON AND EDWARD M. LE FLUFY, OF VANCOUVER, BRITISH COLUMBIA, CANADA.

AIR VALVE FOR PNEUMATIC TIRES.

Application filed April 10, 1924. Serial No. 705,526.

Our invention relates to improvements in air valves for pneumatic tires the primary object of which is to provide means whereby the air pressure in a tire may be reduced to any desired pressure if over inflated, a further object is to provide means whereby air from a supply hose may be admitted to the tire until a desired pressure is admitted when the flow of air is diverted to the atmosphere, a still further object is to provide a relief valve construction which will permit the free discharge of air therethrough on a given pressure being exceeded and to close instantly against discharge as soon as such predetermined pressure is slightly reduced.

The invention consists essentially of a tubular body having an air inlet and an outlet to the tire and a discharge outlet controlled by a compensated valve, as will be more fully described in the following specification in which:—

In the drawings like characters of reference indicate corresponding parts in each figure.

Figure 1:
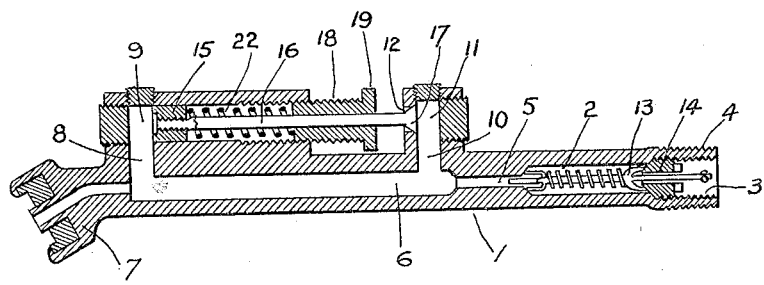
Fig. 1 is a sectional view of our invention.

The numeral 1 indicates generally the body of the air valve in which is provided an inlet valve chamber 2 threaded internally as at 3 and externally as at 4 for connection to an air hose from a pump or other source of supply, extending from the inner end of the chamber 2 is a narrow passage 5 which leads into a main air chamber 6, a tire valve chuck 7 of any suitable type is fitted to the outer end of the chamber 6 for the purpose of depressing the valve plunger and admitting or discharging air to or from the tire through the chamber.

Figure 2:
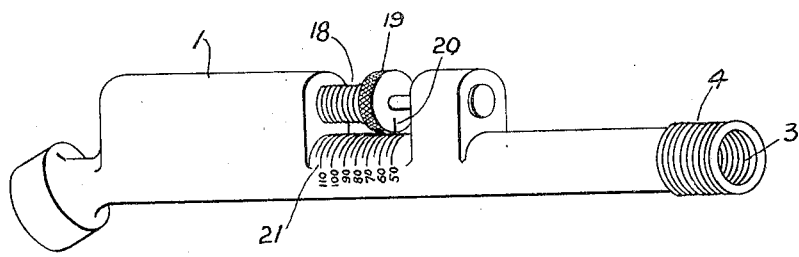
Fig. 2 is a perspective view thereof.

The numeral 8 indicates a passage leading from the chamber 6 to a cylinder 9, and 10 is a passage leading to a relief valve chamber 11 from which air is discharged through an outlet 12 when the predetermined pressure is exceeded. The inlet valve chamber is provided with a suitable valve plunger 13 engaging a seat 14 held in position by the internal thread 3 to admit air from the hose and to close against its return. In the cylinder 9 a piston 15, having a piston rod 16, is fitted, the outer end of the piston rod being formed as a poppet valve 17 which seats to close the outlet 12 from the relief valve chamber 11, an adjusting screw sleeve 18 surrounds the piston rod 16 and is screwed into the outer end of the cylinder 9, the head 19 is provided with a pointer 20 (see Fig. 2) to indicate on the scale 21 the pressure at which the poppet valve 17 opens or closes.

A spiral spring 22 is inserted between the piston 15 and the inner end of the sleeve 18 to exert a pressure against the piston and to seat the poppet valve 17 against the outflow of air from the chamber 11.

Having thus described the several parts of our invention we will now explain its operation.

The device may be permanently attached to an air hose, or if not and it is desired to use it in conjunction with a service hose, the chuck of such hose is applied to the threaded end of the inlet chamber 2 and the chuck 7 applied to the tire valve. The air pressure from the hose passes the inlet valve 13 through the chamber 6 and the chuck 7 until the pressure indicated by the pointer 20 on the scale is reached, when the air pressure exerted on the piston 15 will raise the poppet valve 17 (which has a smaller surface than the piston area) the reduction of air pressure contingent to any discharge relieves the pressure on the piston and allows the valve to again close, thus setting up a rapid fluctuation of pressure in the body of the valve and a chattering of the valve which results in a definite closure of the valve immediately following any slight reduction of air pressure below the predetermined blow off pressure.

It will be apparent that the device may be used separately as a relief valve only, since the valve 13 is normally held against the outflow of air therethrough.

What we claim as our invention is:—

1. A tire inflating valve comprising an air chamber provided with an inlet for connection to a source of air pressure, a main outlet for connection to a tire valve and a relief outlet for the escape of excess pressure, a relief valve normally closing the relief outlet and arranged to operate against the pressure in said chamber during both opening and closing of the valve and yieldable means normally holding such valve in closed position but serving to permit said valve to open automatically when the pressure in said chamber reaches a predetermined value.

2. A tire inflating valve comprising an air chamber provided with a relief opening for the escape of excess pressure, a relief valve normally closing said opening and including oppositely facing surfaces of different area exposed to the pressure in said chamber, the pressure exerted on the larger surface being in a valve opening direction while that exerted on the smaller surface is in a valve closing direction, a spring arranged to resist movement of the valve in response to the pressure on said larger surface, and means for regulating the spring to vary the effective resistance thereof.

3. An air valve for pneumatic tires comprising a body forming an air chamber having an air inlet and an air outlet, a valve for controlling the outlet arranged to open against the pressure in said chamber, a movable piston connected to the valve and subject to air pressure within the chamber, and means for controlling the movement of the piston to operate at any pre-determined pressure.

4. An air valve for pneumatic tires comprising a body forming an air chamber, a relief valve arranged to open inwardly and against the pressure in said chamber, a supplemental chamber open to the air chamber at one end, a piston operating within such supplemental chamber, a connection between the piston and the discharge valve, and means for exerting yieldable pressure against the opposite side of the piston.

5. An air valve for pneumatic tires comprising a body forming an air chamber, a relief valve arranged to open inwardly and against the pressure in said chamber, a supplemental chamber open to the air chamber, a piston operating within such supplemental chamber, a connection between the piston and the discharge valve adapted to move the valve to and from its seat by the movement of the piston, and adjustable means for exerting yieldable pressure against the opposite side of the piston.

6. An air valve for pneumatic tires comprising a body forming an air chamber having a valved inlet port leading thereinto substantially U-shaped in form, and having an outlet port in one arm, an inwardly opening valve for opening and closing said port, and means operated by air pressure in the other arm of the chamber for moving the valve to and from its seat.

7. An air valve for pneumatic tires comprising a body forming a main air chamber having a valved inlet port leading thereinto and substantially U-shaped in form, and having an outlet port in one arm, a valve normally closing said outlet port and arranged to open inwardly and against the pressure in said arm, a supplemental chamber leading from the other arm of the main chamber, a spring pressed piston within the supplemental chamber, and connecting means between the piston and the valve whereby the valve is opened and closed by the movement of the piston.

8. An air valve for pneumatic tires comprising a body forming a main air chamber having a valved inlet port leading thereinto and substantially U-shaped in form, and having an outlet port in one arm, a valve normally closing said outlet port and arranged to open inwardly and against the pressure in said arm, a supplemental chamber leading from the other arm of the main chamber, a spring pressed piston within the supplemental chamber, connecting means between the piston and the valve whereby the valve is opened and closed by the movement of the piston, and adjustable means for controlling the spring pressure opposing the movement of the piston.

9. An air valve for pneumatic tires comprising a body forming a main air chamber having a valved inlet port leading thereinto and substantially U-shaped in form and having an outlet port in one arm, a valve normally closing said outlet port and arranged to open inwardly and against the pressure in said arm, a supplemental chamber leading from the other arm of the main chamber, a longitudinally movable member, and a piston located in the supplemental chamber adjacent the arm of the main chamber, a closure member adjustably secured within the other end of the supplemental chamber, a spring extending between the closure member and the piston, and connecting means between the piston and the valve of the air outlet port.

10. A device of the class described comprising a tubular body having an air inlet and an air outlet and a discharge valve adapted to open against air pressure within the tubular body and air pressure means for opening said valve.

Dated at Vancouver, B. C., this third day of April, 1924.

THOMAS C. MAHON.
EDWARD M. LE FLUFY.